United States Patent [19]

Graham et al.

[11] 3,860,537
[45] Jan. 14, 1975

[54] PROCESS FOR PREPARING A FOAMED SHAPED ARTICLE

[75] Inventors: Neil Bonnette Graham; Richard George Cleveland Henbest; Francis Gowland Hutchinson, all of Runcorn, Great Britain

[73] Assignee: Imperial Chemical Industries Limited, London, England

[22] Filed: Aug. 7, 1972

[21] Appl. No.: 278,345

[30] Foreign Application Priority Data
Aug. 18, 1971   Great Britain.................... 38739/71

[52] U.S. Cl.. 260/2.5 AN, 260/2.5 BD, 260/75 UA, 260/859
[51] Int. Cl............................................. C08g 22/44
[58] Field of Search ......... 260/2.5 AN, 2.5 BD, 859

[56] References Cited
UNITED STATES PATENTS

| | | | |
|---|---|---|---|
| 2,642,403 | 6/1953 | Simon et al................... | 260/2.5 AN |
| 2,740,743 | 4/1956 | Pace........................... | 260/2.5 AN X |
| 3,294,711 | 12/1966 | VonBonin..................... | 260/2.5 AN |
| 3,404,107 | 10/1968 | Bearden et al................. | 260/2.5 AN |
| 3,591,532 | 7/1971 | Abercrombie et al. ........ | 260/2.5 AN |
| 3,709,843 | 1/1973 | Zocco et al................... | 260/2.5 AN |

FOREIGN PATENTS OR APPLICATIONS

| | | |
|---|---|---|
| 1,272,984 | 5/1972 | Great Britain |
| 1,279,673 | 6/1972 | Great Britain |

Primary Examiner—H. S. Cockeram
Attorney, Agent, or Firm—Cushman, Darby & Cushman

[57] ABSTRACT

A foamed shaped polymeric article, for example, a sheet capable of being further shaped, the article being formed by foaming and partially curing a mixture comprising
  a. from 5% to 95%, preferably 40% to 70%, by weight of polyurethane precursors comprising at least one polyfunctional compound e.g., a polyol, containing groups reactive with isocyanate groups and at least one polyisocyanate, and
  b. from 95% to 5%, preferably 60% to 30%, by weight of cured polyester resin precursors comprising
    i. at least one ethylenically unsaturated polyester, and,
    ii. at least one ethylenically unsaturated monomer copolymerisable with the ethylenically unsaturated polyester, the extent of curing of the precursors in the mixture being chosen such that the foamed shaped polymeric article is capable of being further shaped.

16 Claims, 2 Drawing Figures

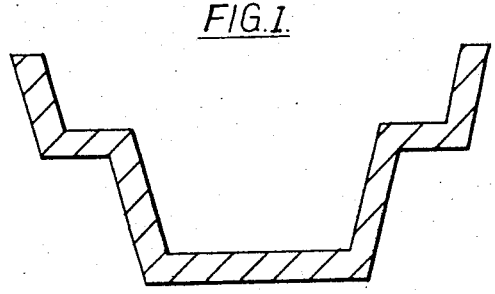
FIG.I.
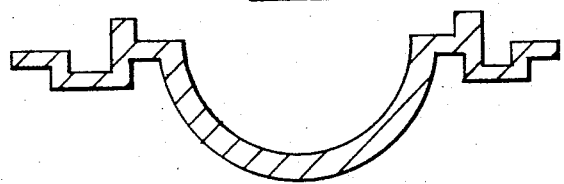
FIG.II.

PROCESS FOR PREPARING A FOAMED SHAPED ARTICLE

This invention relates to a foamed, shaped, polymeric article which is capable of being further shaped, to a method of producing said article, and to a method of shaping said article.

According to the present invention there is provided a foamed shaped polymeric article capable of being further shaped, said article being formed by foaming and partially curing a mixture comprising a. from 5% to 95% by weight of polyurethane precursors comprising at least one polyfunctional compound containing groups reactive with isocyanate groups and at least one polyisocyanate, and b. from 95% to 5% by weight of cured polyester resin precursors comprising
   i. at least one ethylenically unsaturated polyester containing at least two groups reactive with isocyanate groups, and
   ii. at least one ethylenically unsaturated monomer copolymerisable with said ethylenically unsaturated polyester, the extent of curing of the said precursors being chosen such that the foamed, shaped polymeric article is capable of being further shaped.

In a further embodiment of our invention we provide a process for the production of a foamed, shaped, polymeric article capable of being further shaped, said process comprising foaming and partially curing a mixture of the precursors of a polyurethane and the precursors of a cured polyester resin, as hereinbefore described, the extent of curing of the precursors in said mixture being chosen such that the said article is capable of being further shaped.

The foamed, shaped, polymeric article capable of being further shaped will hereinafter be referred to as the partially cured foamed article.

By curing we mean the reaction of the polyfunctional compound and the ethylenically unsaturated polyester with the polyisocyanate and the copolymerisation of the ethylenically unsaturated polyester with the ethylenically unsaturated monomer.

Curing of the mixture of polyurethane precursors and polyester resin precursors may be effected in a number of way, particularly by selection of suitable catalysts and temperatures. For example, in a first method the polyfunctional compound and the ethylenically unsaturated polyester may be reacted with the polyisocyanate and the mixture may be foamed to produce the partially cured foamed article, the ethylenically unsaturated polyester and the ethylenically unsaturated monomer being substantially uncopolymerised. Alternatively, in a second method the ethylenically unsaturated polyester may be substantially copolymerised with the ethylenically unsaturated monomer and foaming may take place before any substantial reaction between the polyurethane precursors and the ethylenically unsaturated polyester has taken place.

If desired, the reaction between the polyfunctional compound, the ethylenically unsaturated polyester, and the polyisocyanate, and the copolymerisation of the ethylenically unsaturated polyester and the ethylenically unsaturated monomer may take place simultaneously.

However, the first mentioned method is to be preferred and it can be arranged, for example, by suitable choice of the nature of the components of the mixture and in particular by choice of suitable catalysts, and, if necessary, suitable inhibitors, for the polyfunctional compound and the ethylenically polyester to be reacted with the polyisocyanate and for foaming to take place at a relatively low temperature, e.g. at or near ambient temperature, to produce a partially cured foamed article which is capable of being further shaped, copolymerisation of the ethylenically unsaturated polyester and the ethylenically unsaturated monomer remaining substantially quiescent at this relatively low temperature. The latter copolymerisation, optionally after further shaping of the article has been effected, may subsequently be activated by raising the temperature, the curing reaction of the mixture thus being completed.

The process of foaming and curing the aforementioned precursors results in the production of a foamed, shaped, polymeric article which becomes more rigid as the extent of the curing increases. Clearly, the extent of curing in the partially cured foamed article should not be so great that the article produced is so rigid that it can no longer be further shaped. Ideally, the article is flexible. On the other hand, the extent of curing should also not be so small that the partially cured foamed article is not readily handleable. Desirably, the extent of curing is chosen such that the partially cured foamed article is not only readily capable of being further shaped but also such that the article is non-sticky, and thus conveniently handleable. The man skilled in the art will, particularly with the aid of the examples set out the end of this specification, be able to produce a partially cured foamed article which is readily shapable and which is also non-sticky and readily handlable.

If desired, after further shaping of the partially cured foamed article has been effected the curing of the mixture of precursors may be substantially completed to produce a more rigid foamed shaped polymeric article, hereinafter referred to as the fully cured foamed article.

Foaming may be effected by the action of any suitable foaming agent. For example, the foaming agent, which may be included in the mixture, may be a low boiling liquid which is vapourised during the curing reaction, e.g., by the heat generated on curing, or it may be a compound or mixture of compounds which, under the conditions of the curing reaction, decomposes or otherwise reacts and evolves a gas capable of effecting foaming. For example, the foaming agent may be water which reacts with the isocyanate groups in the polyisocyanate to evolve carbon dioxide which effects the foaming, or it may be, for example, a low boiling halogenated hydrocarbon. Alternatively, an inert gas, e.g., nitrogen may be passed through the mixture during the curing reaction in order to effect foaming.

In general, foaming of the mixture of precursors will be substantially completed during that part of the curing reaction in which the partially cured foamed article capable of being further shaped is produced, although we do not exclude the possibility of some foaming taking place during that part of the curing reaction in which the curing is completed to produce the fully cured foamed article.

The properties of the fully cured foamed article produced after completion of the curing reaction are dependent on the nature of and the proportions of the polyurethane precursors and the cured polyester resin precursors in the mixture from which the article is produced.

For an optimum balance of properties in the fully cured foamed article it is preferred that the mixture of precursors should comprise from 40% to 70% by weight of polyurethane precursors and from 60% to 30% by weight of cured polyester resin precursors.

Where high impact strength and friability resistance is the prime requirement in the fully cured foamed article it is preferred that the mixture of precursors comprise 50% or more by weight of polyurethane precursors and 50% or less by weight of cured polyester resin precursors. More preferably the mixture comprises from 50% to 80% by weight of polyurethane precursors and from 50% to 20% by weight of cured polyester resin precursors as with a larger amount of polyurethane precursors and correspondingly less cured polyester resin precursors the resultant fully cured foamed article may have a relatively low heat distortion temperature.

We find that in general the higher is the glass-rubber transition temperature of the polyurethane which could be prepared by reaction of the polyurethane precursors alone in the absence of foaming agent and cured polyester resin precursors the higher is the heat-distortion temperature and the rigidity of the fully cured foamed article, and that for optimum balance of impact strength and heat distortion temperature in the fully cured foamed article it is preferred to use polyurethane precursors capable of forming, if reacted alone in the absence of foaming agent and cured polyester resin precursors, a polyurethane having a glass-rubber transition temperature of at least 25°C, more preferably at least 35°C.

The glass-rubber transition temperature of the polyurethane may be measured using a Du Pont 900 Thermal Analyser at a rate of heating of the polyurethane of 20°C per minute.

It is generally desirable that in the mixture of precursors the groups in the polyfunctional compound and in the ethylenically unsaturated polyester which are reactive with isocyanate groups should be substantially reacted with the polyisocyanate and to this end it is preferred, although not essential, that the molar proportion of groups reactive with isocyanate groups in the polyfunctional compound plus the ethylenically unsaturated polyester to isocyanate groups in the polyisocyanate be in the range 0.8:1 to 1.2:1, and more preferably in the range 0.9:1 to 1:1.1.

The polyurethane precursors, which may be substantially free of ethylenic unsaturation, comprise at least one polyfunctional compound containing groups reactive with isocyanate groups, e.g., hydroxyl and/or carboxyl groups, and at least one polyisocyanate. The polyurethane precursors may themselves, if reacted together in the absence of cured polyester resin precursors be capable of forming a linear polyurethane. In this case the polyurethane precursors will comprise at least one difunctional compound reactive with isocyanate and at least one diisocyanate. Alternatively, the polyurethane precursors may be such as to be capable of forming a cross-linked polyurethane if reacted together. In this case the polyurethane precursors will comprise at least one polyfunctional compound and at least one polyisocyanate the functionality of at least one or other or both of the polyfunctional compound and polyisocyanate being greater than two.

Suitable polyurethane precursors and cured polyester resin precursors are described in our British Patent Specification Nos. 1,272,984 and 1,279,673 the disclosures of which are incorporated herein.

Suitable polyfunctional compounds include, for example, polyols, e.g., polyether polyols, and polyesters, especially hydroxy-terminated polyesters.

Examples of suitable polyols include glycols of the structure HO—R—OH where R is, for example, an alkylene chain, e.g., ethylene glycol, propylene glycol, butane-1:4-diol, pentane-1:5-diol, hexane-1:6-diol, di(ethylene glycol) and di(propylene glycol). Other suitable polyols include oxyalkylated bisphenols having the structure

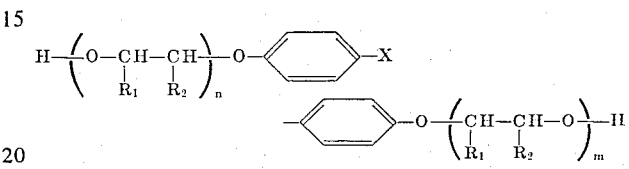

where $R_1$ and $R_2$ are selected from hydrogen atoms and hydrocarbyl groups, preferably alkyl groups, e.g., methyl, X is a divalent radical, e.g.,

where $R_1$ and $R_2$ have the designation ascribed above, and n and m are whole numbers, generally in the range 1 to 5.

Other suitable polyols include polymers, e.g., low molecular weight polymers, derived from glycols, for example, poly(ethylene glycol) poly(propylene glycol) and poly(butylene glycol). Suitable polyols which are trifunctional or of even higher functionality include, for example, glycerol, pentaerythritol, neopentyl glycol, trialkylol alkanes, e.g., triethylol propane, triethylol propane, tributylol propane and oxyaltylated. derivatives, especially those of low molecular weight, of said trialkylol alkanes, e.g., oxyethylated trimethylol propane and oxypropylated trimethylol propane. Oxyalkylated glycerols are also suitable, e.g., oxypropylated derivatives of glycerol.

Examples of suitable polyesters for use as the polyfunctional compound include condensates of at least one diol of the structure HO—R—OH with at least one dicarboxylic acid of the structure HOOC—R—COOH where R is, for example an alkylene chain which may be the same or different in the diol and in the diacid. Suitable examples include poly(ethylene adipate), poly(ethylene sebacate) poly(ethylene glutarate), poly(ethylene pimelate), poly(propylene adipate), poly(propylene sabacate), poly(propylene glurate) and poly(propylene pimelate).

Suitable polyesters of functionality greater than two may be prepared, for example, by condensation of one or more polyols of functionality greater than two, possible in admixture with one or more diols, with one or more dicarboxylic acids. If desired one or more of the dicarboxylic acids may be replaced by one or more polycarboxylic acids of functionality greater than two. Alternatively, one or more poly carboxylic acids of functionality greater than two, possibly in admixture with one or more dicarboxylic acids, may be condensed with one or more diols. Polyesters of functionality greater than two which may be mentioned in particular include a condensate of adipic acid or terephthalic acid with glycerol and either ethylene glycol, proplene glycol, diethylene glycol or dipropylene glycol.

The polyisocyanate component of the polyurethane precursors may be difunctional or it may be trifunctional or of even higher functionality. If desired, a mixture of at least one diisocyanate and at least one triisocyanate or isocyanate of even higher functionality may be used.

The polyisocyanate may, for example, by aliphatic, cycloaliphatic or aromatic or may, for example, contain tn the same polyisocyanate molecule aliphatic or aromatic isocyanate groups, aliphatic and cycloaliphatic isocyanate groups, cycloaliphatic and aromatic isocyanate groups, or even aliphatic, cycloaliphatic and aromatic isocyanate groups.

Examples of suitable polyisocyanates include, 2:4-and 2:6-toluene diisocyanates, or mixtures thereof, diisocyanates of the structure OCN—R—NCO where R is an alkylene chain, for example, tetramethylene diisocyanate, pentamethylene diisocyanate, hexamethylene diisocyanate and octamethylene diisocyanate, and cycloaliphatic diisocyanates, e.g., 4:4'-dicyclohexylmethane diisocyanate.

For a good combination of thermal and impact properties in the fully cured foamed article a preferred diisocyanate is that having the structure

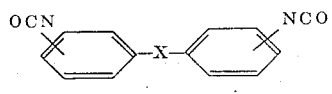

where X is a divalent radical which preferably contains not more than three atoms in the chain between the phenyl groups. For example, X may be —O— or —SO$_2$— but is preferably —(CH$_2$)$_n$— or a hydrocarbyl substituted derivative thereof, where n is a whole number in the range 1 to 3. Suitably, the diisocyanate having the above structure is a 4:4'-derivative, and is preferably 4:4'-diphenylmethane diisocyanate. Examples of suitable polyisocyanates having a functionality of greater than two include a product sold as Suprasec DN by Imperial Chemical Industries Limited and containing 4:4'-diphenylmethane diisocyanate and having an overall isocyanate functionality of approximately 2.8. Other suitable polyisocyanates having a functionality greater than two include isocyanurates formed by condensation of three molecules of a diisocyanate.

The ethylenically unsaturated polyester component of the cured polyester resin precursors may be derived, for example, by esterification of an unsaturated dicarboxylic acid or mixture of such acids with a saturated diol or mixture of such diols, or by esterification of a saturated dicarboxylic acid or mixture of such acids with an unsaturated diol or mixture of such diols. If desired one or more unsaturated acids may be used together with or in place of the saturated acid or acids, or one or more unsaturated diols may be used together with or in place of the saturated diol or diols. Where possible, an anhydride may be used in place of the corresponding dicarboxylic acid. One or more carboxylic acids of functionality greater than two may be used together with or in place of one or more of the dicarboxylic acids. Similarly, one or more polyols of functionality greater than two may be used together with or in place of one or more of the diols.

Examples of suitable ethylenically unsaturated polyesters include, for example, those formed by esterification of maleic acid or anhydride, fumaric acid, or itaconic acid, or mixtures thereof, with, for example, ethylene glycol, propylene glycol, butane-1:4-diol, pentane-1:5-diol, cyclohexane-1:4-diol, glycerol, trimethylol propane or neopentyl glycol, or mixtures thereof. Suitable saturated acids which may also be incorporated into the above described ethylenically unsaturated polyesters include, for example phthalic acid or anhydride, isophthalic acid, terephthalic acid, adipic acid, sebacic acid, glutaric acid, pimelic acid, or mixtures thereof. Examples of suitable ethylenically unsaturated polyesters which may be mentioned in particular include a condensate of isophthalic acid and fumaric acid with propylene glycol, a condensate of phthalic acid or anhydride and fumaric acid with propylene glycol, cyclohexane-1:4-diol or neopentyl glycol, and a condensate of propylene glycol with either fumaric acid or a mixture of phthalic acid or anhydride and maleic acid or anhydride.

Suitable ethylenically unsaturated monomers copolymerisable with the ethylenically unsaturated groups in the polyester include, vinyl monomers for example, vinyl esters, aromatic vinyl compounds and vinyl nitriles. Suitable vinyl esters include, for example, vinyl acetate and esters of acrylic acid having the formula CH$_2$ = CH — COOR$_3$ where R$_3$ is an alkyl, aryl, alkaryl, aralkyl or cycloalkyl group. For example, R$_3$ may be an alkyl group having from 1 to 20, and preferably 1 to 10 carbon atoms. Particular vinyl esters which may be mentioned include, for example, methyl acrylate, ethyl acrylate, n- and isopropyl acrylates, and n-, iso-and tertiary butyl acrylates. Other suitable vinyl esters include, for example, esters of formula CH$_2$ = C(R$_4$) COOR$_3$, where R$_4$ may be, e.g., methyl and R$_3$ and R$_4$ may be the same or different. Particular vinyl esters which may be mentioned include, for example, methyl methacrylate, ethyl methacrylate, n-and isopropyl methacrylate, and n-, iso and tertiary-butyl methacrylate.

Aromatic vinyl compounds which may be mentioned include, for example, styrene and derivatives thereof, e.g., α-alkyl derivatives of styrene, e.g., α-methyl styrene; and vinyl toluene.

Suitable vinyl nitriles include, for example, acrylonitrile and derivatives thereof, e.g., methacrylonitrile.

Polyfunctional ethylenically unsaturated monomers, that is, monomers containing two or more ethylenically unsaturated groups, and also suitable. Suitable such monomers include, for example, a condensate of a diol with an ethylenically unsaturated acid, e.g., glycol dimethacrylate; and divinyl benzene.

The cured polyester resin precursors preferably comprise ethylenically unsaturated monomer or monomers and ethylenically unsaturated polyester in a proportion in the range 40% to 90% by weight of at least one ethylenically unsaturated polyester to 60% to 10% by weight of at least one ethylenically unsaturated monomer, although proportions outside this range may be used if desired. More preferably the said precursors comprise from 50% to 70% by weight of at least one ethylenically unsaturated polyester and from 50% to 30% by weight of at least one ethylenically unsaturated monomer.

The amount of foaming agent used will depend on the extent of foaming which is desired in the partially cured foamed article. For example, where the foaming agent is a low boiling liquid or a reactive compound 2% to 20% of foaming agent by weight of the mixture may suitably be used, although proportions outside this range may be used if desired.

Reaction of the polyfunctional compound and the ethylenically unsaturated polyester with the polyisocyanate may be effected under the influence of suitable urethane catalysts, e.g., triethylene diamine, and metal compounds, e.g., stannous octoate, and in particular dibutyl tin dilaurate. Similarly, copolymerisation of the ethylenically unsaturated polyester and the ethylenically unsaturated monomer may be effected under the influence of suitable catalysts, for example, free radical generators, e.g., peroxides, e.g., dicumyl peroxide, ditertiary butyl peroxide, hydroperoxides, acyl peroxides, and peresters, e.g., tertiary butyl peroctoate, the copolymerisation preferably being effected at a temperture somewhat above the temperature at which the polyurethane precursors and the ethylenically polyester are reacted. As discussed hereinbefore it can be arranged, for example, by suitable choice of the nature of the components of the mixture and in particular by choice of suitable catalysts, and, if necessary, suitable inhibitors, for the polyfunctional compound and the ethylenically unsaturated polyester to react with the polyisocyanate and for foaming to take place at a relatively low temperature, e.g., at or near ambient temperature, to produce a partially cured foamed article which is capable of being further shaped, copolymerisation of the ethylenically unsaturated polyester and the ethylenically unsaturated monomer remaining substantially quiescent at this relatively low temperature. The latter copolymerisation, optionally after further shaping of the article, may subsequently be activated by raising the temperature, the curing reaction of the mixture thus being completed.

Thus, it is preferred that the mixture from which the partially cured foamed article is prepared includes at least one catalyst capable of assisting reaction of the polyfunctional compound and the ethylenically unsaturated polyester with the polyisocyanate. Furthermore, it is preferred, where the mixture includes a catalyst capable of assisting copolymerisation of the ethylenically unsaturated monomer and the ethylenically unsaturated polyester, that the catalyst be substantially inactive at, or be of only low activity at, the temperature at which the reaction between the polyfunctional compound, the ethylenically unsaturated polyester, and the polyisocyanate is effected, and that the mixture also includes an inhibitor for free-radical reactions which assists in suppressing undesirable premature copolymerisation of the ethylenically unsaturated monomer and the ethylenically unsaturated polyester. Suitable inhibitors include quinones and phenols.

The partially cured foamed article of our invention which is capable of being further shaped will generally be of simple profile and is conveniently in the form of a sheet, although the article may be in any desired shape. The article may be produced by charging to a suitably shaped mould a mixture of precursors as hereinbefore described and causing or allowing the curing reaction and foaming to proceed to the desired extent as hereinbefore described. If desired, the partially cured foamed article, particularly when in the form of a sheet, may be made continuously, for example, by continuously charging a mixture of the precursors to a moving band and causing or allowing the precursors to foam and partially cure to the desired extent on the band, the sheet being continuously removed from the band.

The partially cured foamed article of our invention, when in the preferred form of a sheet, may be stored in the form of a roll. If the layers of the roll show any tendency to adhere to each other they may conveniently be separated from each other by, for example, a film-like layer e.g., of polyethylene.

Further shaping of the foamed shaped article may be effected by any suitable means. For example, the partially cured foamed article, which is generally of simple profile, may be caused to conform to a mould the shape of which is that desired in the fully cured foamed article of more complex profile. It may be necessary to apply heat in order to effect the further shaping in which case the heat applied should not be such that further curing takes place to such an extent that the article cannot be further shaped to the desired extent. The further shaping of the partially cured foamed article may suitably be effected by compression moulding.

After the further shaping of the partially cured foamed article has been effected the curing reaction may be completed, for example, by heating the article in the mould in order to effect the aforementioned copolymerisation, or, if the article is able to retain the desired shape when unconstrained by the mould, by removing the article from the mould and heating.

Where the partially cured foamed article is further shaped in a mould care should be taken that the pressure exerted by the mould on the article during the further shaping is not so great as to result in an undesirably large amount of collapsing of the foam. On the other hand, we have found that by control of the pressure exerted by the mould the partially cured foamed article can be caused to collapse in the region of the surface of the article so as to produce a relatively smooth surface on the article.

Some of the properties of the fully cured foamed article, for example, the flexural properties and the friability resistance, may be improved by incorporation of fibrous material into the mixture from which the partially cured foamed article is produced. Suitably, the fibrous material is incorporated in such a way as to be concentrated in the region of the surface of the article. The fibrous material may be, for example, glass fibre, carbon fibre, asbestos fibre or fibrous material derived from an organic polymer, for example, a polyester, e.g., poly(ethylene terephthalate), or a polyamide, e.g., poly(hexamethylene adipamide), or the polyamide derived by polymerisation of $\epsilon$-caprolactam or the corresponding aminocarboxylic acid.

The amount of fibrous material to be incorporated will depend on the desired improvement in the particular property of the fully cured foamed article which is of interest. In general from 5% to 50% of fibrous material by weight of the total weight of the fibre plus mixture from which the foamed article is produced will suffice. Where it is desired to effect a substantial improvement in properties from 20% to 50% by weight of fibrous material is preferred.

The fibrous material should be incorporated into the mixture prior to commencement of the curing reaction, or at most after only a small amount of the curing reaction has taken place.

Glass fibres may be in any suitable form, e.g., in the form of a mat, ribbons, tapes, continuous fibres or as chopped rovings. Where chopped rovings are used they are preferably of at least ½ inch in length.

The mixture from which the partially cured foamed article is produced may also have particulate filler incorporated therein, e.g., in a proportion of 5% to 50% of filler by weight of filler plus mixture. Suitable fillers include, talc, mica, carbon black and calcium carbonate.

The fully cured foamed article may be used in applications where light weight articles are required, for example, as panels, insulation, and in packaging applications.

The invention will now be illustrated by the following Examples in which all parts are expressed as parts by weight.

EXAMPLE 1

200 parts of a mixture of 38% by weight of styrene and 62% by weight of an ethylenically unsaturated polyester, the polyester having an acid value of 44 mg/KOH/g$^{-1}$ and a hydroxyl value of 52 mg/KOH/g$^{-1}$ and being formed by condensing fumaric acid and isophthalic acid with propylene glycol (fumaric acid:isophthalic acid molar ratio 3:1), were charged to a vessel equipped with a stirrer. Thereafter 120 parts of a condensate having a hydroxyl value of 550 mg/KOH/g$^{-1}$ and formed by condensing adipic acid, diethylene glycol and glycerol in molar proportions of 3:6.7:1.23 were added followed by 10 parts of dibutyl tin dilaurate, 5 parts of ditertiary butyl peroxide 2.5 parts of a 33% solution of triethylene diamine in diethylene glycol, 10 parts of a silicone oil (Silicocell 380), and 35 parts of a foaming agent Arcton 11 boiling at 28°C.

The contents of the vessel were thoroughly mixed by stirring at room temperature and 180 parts of a polyisocyanate containing 4:4'-diphenyl methane diisocyanate and having an isocyanate functionality of approximately 2.8 sold commercially as Suprasec DN by Imperial Chemical Industries Limited were added. Stirring was continued for 30 seconds and a portion of the contents of the vessel was poured into the cavity of a poly(tetrafluoroethylene) coated mould having dimensions of 6 in. × 6 in. × ½ in.

The contents of the mould began to foam due to the volatilisation of the Arcton 11 under the influence of the exotherm of the reaction and after 15 minutes the partially cured foamed article was removed from the mould. The product was a flexible foamed sheet having dimensions 6 in. × 6 in. × 0.8 in.

Thereafter the foamed sheet was further shaped in a two part mould into an article shown in section in FIG. 1, the article having a maximum diameter of 3¼ in. and a maximum height of 1 in. The sheet was pressed and heated at a temperature of 135°C for 30 minutes, to complete the cure. The moulded light weight article removed from the mould had a smooth surface and was rigid.

EXAMPLE 2

The procedure of Example 1 was followed except that in place of the styrene and unsaturated polyester used in Example 1 there was used 200 parts of a mixture containing 33% by weight of styrene and 67% by weight of an ethylenically unsaturated polyester, the mixture having an acid value of 28 mg/KOH/g$^{-1}$ and being sold as Fillabond 8009 by Synthetic Resins Ltd.

The flexible foamed sheet removed from the mould was further shaped and cured in a two part mould following the procedure described in Example 1 except that the mould used was such as the produce an article having the shape shown in section in FIG. II, the article having a maximum diameter of 4½ in. and a maximum height of 1½ in. The average thickness of the walls of the moulded article was ⅛ in.

EXAMPLE 3

The procedure of Example 2 was followed to produce a flexible foamed sheet except that in place of the Fillabond 8009 there was used 25 parts of a mixture of 35% by weight of styrene and 65% by weight of an unsaturated polyester, the mixture having an acid value of 32 mg/KOH/g$^{-1}$ and being sold as Wresinol 11001 by Resinous Chemicals Limited. 31.6 parts of the condensate as used in Example 2, 1 part of ditertiary butyl peroxide, 1 part of dibutyl tin dilaurate, 0.5 part of the solution of triethylene diamine in diethylene glycol, 1.8 parts of silicone oil, 6.5 parts of Arcton 11 foaming agent, and 43.4 parts of Suprasec DN were used.

The further shaping and curing procedure of Example 2 was followed to produce a smooth surfaced fully cured foamed article.

EXAMPLE 4

The procedure of Example 3 was followed with substantially similar results except that in place of the Wresinol 11001 used in Example 3 there was used 25 parts of a mixture of styrene and unsaturated polyester as used in Example 1.

EXAMPLE 5

The procedure of Example 2 was followed to produce a flexible foamed sheet except that in place of the Fillabond 8009 there was used 40 parts of a mixture of styrene and ethylenically unsaturated polyester (Wresinol 1101) as used in Example 3, and in place of the condensate used in Example 2 there was used 25 parts of oxypropylated glycerol of molecular weight 300. 1 part of ditertiary butyl peroctoate in place of the ditertiary butyl peroxide, 3.6 parts of dibutyl tin dilaurate, 0.5 part of solution of triethylene diamine in diethylene glycol, 3.6 parts of silicone oil, 10 parts of Arcton 11 and 35 parts of Suprasec DN were used.

EXAMPLE 6

The procedure of Example 5 was followed with substantially similar results except that in place of the Wresinol 11001 there was used a mixture having an acid value of 28 mg/KOH/g$^{-1}$ and containing 38% by weight of styrene and 62% by weight of an ethylenically unsaturated polyester (Polymaster 1188, Mitchell and Smith Ltd).

EXAMPLE 7

The procedure of Example 5 was followed with substantially similar results except that Filabond 8009 was used in place of the Wresinol 11001. 15 parts of Arcton 11 and 1 part of solution of triethylene diamine in diethylene glycol were used.

EXAMPLE 8

The procedure of Example 5 was followed with substantially similar results except that in place of the Wresinol 11001 there was used the mixture of styrene and ethylenically unsaturated polyester as used in Example 1.

EXAMPLE 9

The procedure of Example 1 was followed except that before further shaping of the partially cured foamed article the article was stored at room temperature between layers of aluminium foil for 2 weeks before further shaping.

After storage the flexible foamed sheet was moulded with substantially similar results.

EXAMPLE 10

The partial curing and foaming procedure of Example 4 was followed except that before effecting the partial curing and foaming 12.5 parts of 33 mm chopped glass fibre strands (MSS 1401 Fibreglass Ltd.) were added to the mixture.

The partially cured foamed sheet was pressed into a ½ in. thick sheet and heated at 135°C for 35 minutes to produce a rigid foamed sheet.

What we claim is:

1. A foamed polymeric article of simple shape capable of being shaped to a more complex shape and capable of being cured in said more complex shape, said article being formed by foaming shaping and partially curing a mixture comprising
   a. from 5% to 95% by weight of polyurethane precursors comprising at least one polyfunctional compound containing groups reactive with isocyanate groups and at least one polyisocyanate, and
   b. from 95% to 5% by weight of polyester resin precursors comprising
      i. at least one ethylenically unsaturated polyester containing at least two groups reactive with isocyanate groups, and
      ii. at least one ethylenically unsaturated monomer copolymerizable with said ethylenically unsaturated polyester,
the extent of curing of the said precursors in said mixture being chosen such that in the mixture the polyfunctional compound and the ethylenically unsaturated polyester are substantially reacted with the polyisocyanate and the ethylenically unsaturated polyester and the ethylenically unsaturated monomer are substantially uncopolymerized.

2. A foamed shaped polymeric article as claimed in claim 1 in which the mixture from which said article is produced comprises from 40% to 70% by weight of polyurethane precursors and from 60% to 30% by weight of polyester resin precursors.

3. A foamed shaped polymeric article as claimed in claim 1 in which the mixture from which said article is produced comprises 50% or more by weight of polyurethane precursors and 50% by weight or less of polyester resin precursors.

4. A foamed shaped polymeric article as claimed in claim 3 in which the mixture from which said article is produced comprises from 50% to 80% by weight of polyurethane precursors and from 50% to 20% by weight of polyester resin precursors.

5. A foamed shaped polymeric article as claimed in claim 1 in which the polyurethane precursors are substantially free of ethylenic unsaturation.

6. A foamed shaped polymeric article as claimed in claim 1 in which the polyurethane precursors are capable of forming when reacted alone in the absence of polyester resin precursors, a polyurethane having a glassrubber transition temperature of at least 25°C.

7. A foamed shaped polymeric article as claimed in claim 1 in which in the mixture from which said article is formed the molar proportion of the isocyanatereactive groups in the polyfunctional compound plus the ethylenically unsaturated polyester to isocyanate groups in the polyisocyanate is in the range 0.8:1 to 1.2:1.

8. A foamed shaped polymeric article as claimed in claim 1 in which in said article the foaming reaction is substantially completed.

9. A foamed shaped polymeric article as claimed in claim 1 in which the polyurethane precursors include at least one polyfunctional compound selected from polyester and polyether polyols.

10. A foamed shaped polymeric article as claimed in claim 9 in which the polyfunctional compound is a condensate of adipic acid, diethylene glycol and glycerol or is oxypropylated glycerol.

11. A foamed shaped polymeric article as claimed in claim 1 in which in the polyurethane precursors the polyisocyanate is or includes 4:4'-diphenylmethane diisocyanate.

12. A foamed shaped polymeric article as claimed in claim 1 in which, in the mixture from which said article is produced, the polyester resin precursors comprise from 40% to 90% by weight of at least one ethylenically unsaturated polyester and from 60 % to 10% by weight of at at least one ethylenically unsaturated monomer.

13. A foamed shaped polymeric article as claimed in claim 1 in which the article is in the form of a sheet.

14. A process for the production of a foamed shaped polymeric article of complex profile, said process comprising shaping a foamed shaped polymeric article of simple profile as claimed in claim 1 and curing said article of complex profile by copolymerizing said ethylenically unsaturated monomer and said unsaturated polyester.

15. A process as claimed in claim 14 in which the shaping is effected by compression moulding.

16. A process for the production of a foamed polymeric article of simple shape capable of being shaped to a more complex shape and capable of being cured in said more complex shape, said process comprising foaming shaping and partially curing a mixture comprising
   a. from 5% to 95% by weight of polyurethane precursors comprising at least one polyfunctional compound containing groups reactive with isocyanate groups and at least one polyisocyanate, and
   b. from 95% to 5% by weight of polyester resin precursors comprising
      i. at least one ethylenically unsaturated polyester containing at least two groups reactive with isocyanate groups, and
      ii. at least one ethylenically unsaturated monomer copolymerizable with said ethylenically unsaturated polyester,
the extent of curing of the said precursors in said mixture being chosen such that in the mixture the polyfunctional compound and the ethylenically unsaturated polyester are substantially reacted with the polyisocyanate and the ethylenically unsaturated polyester and the ethylenically unsaturated monomer are substantially uncopolymerized.

* * * * *